United States Patent [19]
Saunders et al.

[11] Patent Number: 5,861,215
[45] Date of Patent: *Jan. 19, 1999

[54] LIGHT-GAGE COMPOSITE-COATED FLAT-ROLLED STEEL MANUFACTURE AND PRODUCT

[75] Inventors: William T. Saunders, deceased, late of Weirton, W. Va., by Cleo Saunders, executrix; William H. Dalrymple, Weirton, W. Va.; Jon F. Grubbs, Bloomingdale, Ohio; William L. Johnston, Weirton, W. Va.

[73] Assignee: Weirton Steel Corporation, Weirton, W. Va.

[*] Notice: The term of this patent shall not extend beyond the expiration date of Pat. No. 4,812,365.

[21] Appl. No.: 887,831

[22] Filed: Jul. 3, 1997

Related U.S. Application Data

[62] Division of Ser. No. 417,681, Apr. 6, 1995, Pat. No. 5,674,633, which is a division of Ser. No. 47,451, Apr. 19, 1993, Pat. No. 5,413,645, which is a continuation-in-part of Ser. No. 812,567, Dec. 20, 1991, Pat. No. 5,204,187, and Ser. No. 926,055, Aug. 6, 1992, Pat. No. 5,296,127, which is a continuation of Ser. No. 573,366, Aug. 27, 1990, abandoned, which is a continuation-in-part of Ser. No. 318,677, Mar. 3, 1989, Pat. No. 5,084,358, which is a continuation-in-part of Ser. No. 855,694, Apr. 25, 1986, Pat. No. 4,812,365.

[51] Int. Cl.$^6$ ............................ B32B 15/08; B32B 15/18
[52] U.S. Cl. ........................ 428/416; 428/457; 428/472
[58] Field of Search ..................... 428/623, 626, 428/624, 625, 659, 679, 648, 632, 629, 457, 472, 416

[56] References Cited

U.S. PATENT DOCUMENTS

| | | | |
|---|---|---|---|
| 4,032,678 | 6/1977 | Perfetti et al. | 427/338 A |
| 4,923,762 | 5/1990 | Ishikawa et al. | 428/551 |
| 5,061,575 | 10/1991 | Mohri et al. | 428/623 |
| 5,084,358 | 1/1992 | Saunders | 428/469 |
| 5,102,746 | 4/1992 | Shindou et al. | 428/623 |
| 5,119,657 | 6/1992 | Saunders | 72/42 |
| 5,137,762 | 8/1992 | Aizawa et al. | 428/35.8 |
| 5,296,127 | 3/1994 | Saunders | 205/139 |
| 5,330,850 | 7/1994 | Suzuki et al. | 428/626 |

*Primary Examiner*—John J. Zimmerman
*Attorney, Agent, or Firm*—Shanley and Baker

[57] ABSTRACT

New composite-coated flat-rolled steel product and new methods of manufacture in which low-carbon steel, as received in cold-reduced continuous strip form is prepared for plating, a corrosion-prevention plating is applied, and a selected polymeric coating with lubricant is applied as the finish surface. The resulting composite-coated steel substrate is cold-rolled to decrease the composite-coated steel substrate gage. Selection of cold rolling steps, with non-use or selected use of stress-relief type of heat treatment before and/or after an initial cold-rolling of the steel substrate as received prior to surface preparation, provides for selective tin mill manufacture of composite-coated steel of various weights per unit area, for example, in the range of about 35 to about 100 lb/bb, produced by cold rolling of the composite-coated flat-rolled steel.

10 Claims, 2 Drawing Sheets

LIGHT-GAGE COMPOSITE-COATED FLAT-ROLLED STEEL MANUFACTURE AND PRODUCT

RELATED APPLICATIONS

This application is a division of co-owned U.S. application Ser. No. 08/417,681, filed Apr. 6, 1995 entitled LIGHT-GAGE COMPOSITE-COATED FLAT-ROLLED STEEL MANUFACTURE AND PRODUCT, now U.S. Pat. No. 5,674,633, which was a division of co-owned U.S. application Ser. No. 08/047,451, filed Apr. 19, 1993 entitled LIGHT-GAGE COMPOSITE-COATED FLAT-ROLLED STEEL MANUFACTURE AND PRODUCT, now U.S. Pat. No. 5,413,645, which was a continuation-in-part of co-owned U.S. application Ser. No. 07/812,567, filed Dec. 20, 1991 entitled COMPOSITE-COATED FLAT-ROLLED SHEET METAL PRODUCT, now U.S. Pat. No. 5,204,187; and of co-owned U.S. application Ser. No. 07/926,055, filed Aug. 6, 1992 entitled COMPOSITE-COATED FLAT-ROLLED SHEET METAL MANUFACTURE, now U.S. Pat. No. 5,296,127, which was a continuation of co-owned U.S. application Ser No. 07/573,366, filed Aug. 27, 1990 entitled COMPOSITE-COATED FLAT-ROLLED SHEET METAL MANUFACTURE, now abandoned, which was a continuation-in-part of co-owned U.S. Application Ser. No. 07/318,677, filed Mar. 3, 1989 entitled COMPOSITE-COATED FLAT-ROLLED SHEET METAL MANUFACTURE AND PRODUCT, now U.S. Pat. No. 5,084,358, which was a continuation-in-part of U.S. application Ser. No. 06/855,694, filed Apr. 25, 1986 entitled COMPOSITE-COATED FLAT-ROLLED STEEL CAN STOCK AND CAN PRODUCT, now U.S. Pat. No. 4,812,365.

INTRODUCTION TO THE INVENTION

This invention relates to new manufacturing methods for new composite-coated flat-rolled steel product.

"Tin mill practice," has encompassed electrolytic plating of tin, zinc, and chrome/chrome oxide (TFS) on cold-rolled steel "blackplate" as provided to the tin mill. Whether plating tin, zinc or TFS, the plating stage, prior to the present invention, essentially completed the "tin mill practice" carried out in commercial steel plants. (See *Making, Shaping and Treating of Steel,* 8th Ed., ©1964, pp. 950, 951, U.S. Steel, Pittsburgh, Pa., and/or the 10th Ed. ©1985 by AISE, chapter 36, pp. 1139–1153, printed by Henbeck and Held, Pittsburgh, Pa.).

SUMMARY OF THE INVENTION

The present invention expands the range of "tin-mill product" and of "tin mill practice" by new and differing approaches to coated flat-rolled steel manufacture and new practical contribution enables such new products and manufacturing methods to be accomplished using electrolytic plating and cold rolling equipment presently available in steel plant tin mills.

More specifically, the invention enables production of new lighter-gage composite coated flat-rolled steel product than was previously contemplated, while enabling electrolytic plating of steel strip with tin and other metals and the heavier gages capable of being handled by, and deemed most efficient for, the electrolytic plating equipment available in steel plant tin mills.

The above and other advantages and contributions are considered in more detail in describing new processing, materials and products with references to the accompanying drawings.

DETAILED DESCRIPTION

Definitions and background relating to steel plant manufacture of so-called "double-reduced" tin mill product are set forth in *Making, Shaping and Treating of Steel,* 10th Ed., with temper designations, approximate longitudinal yield strengths in ksi, and other characteristics, and are tabulated at p. 1144.

It has not previously been practical to cold-reduce chrome/chrome oxide coated steel (TFS) because of the brittleness of the chrome/chrome oxide coating. And, electrolytic deposition of tin on steel substrate with weight less than fifty-five (55) to about sixty (60) lb/bb has been impractical at the line speeds preferred and with commonly available existing tension-regulating equipment. Further, the "Application Characteristics" of DR-8 as "Relatively hard with limited ductility and highly directional properties" had previously constrained uses which involved shaping such as that required for one-piece can body formation.

However, a new cold-rolling arrangement is made practicable by the present invention along with new tin mill product. For example, a new "triple-cold-reduced" tin mill product is made available in which the gage of the steel substrate is triple cold-reduced to about 0.0035"to 0.004"; and, is capable of being accomplished without an intermediate or a subsequent heat treatment, while providing a longitudinal yield strength not significantly higher than the nominal range for double-reduced temper DR-9; thus enabling shaping such as for one-piece can body formation.

Continuous-strip processing is provided throughout substrate surface preparation, substrate surface corrosion-prevention plating, finish surface coating, and a subsequent gage-reduction taught herein. However, continuous-strip tin mill product manufactured as taught herein can be cut into sheets or blanks for consumer product fabrication; and can be shipped or used as produced because of the protection provided.

Figure 1:
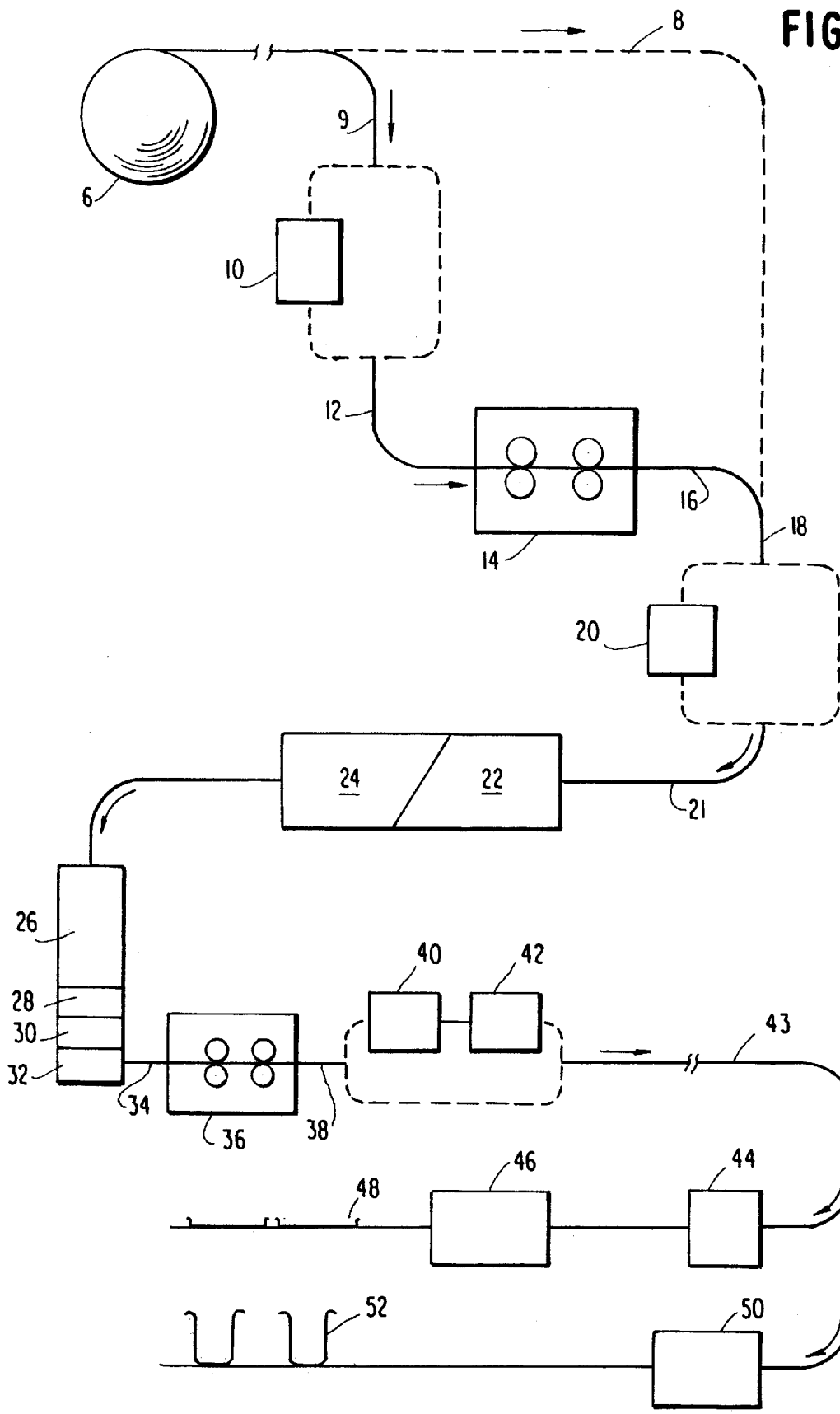
FIG. 1 is diagrammatic general arrangement view for describing methods, apparatus, and product of the invention.

Referring to FIG. 1, coil 6 comprises cold-reduced flat-rolled steel substrate (blackplate) as provided for tin mill processing having a range of about seventy-five lb/bb to about one hundred thirty-five lb/bb.

Cold-reduced blackplate from coil 6 can be fed directly along path 8 toward surface preparation, or can be fed along path 9 toward a temper mill for cold-rolling gage reduction of the steel substrate. Path 9 provides for selection of a stress-relief heat treatment, at station 10, or for omitting that step. With either selection, the blackplate is fed along path 12 toward an initial gage-reduction stage which is suitably carried out in a two-stage cold-rolling mill 14. (That same cold-rolling gage-reduction station can be used again later in the processing being described.) At station 14, the blackplate can be cold-reduced as much as about twenty to about thirty-five percent before being directed along path 16.

The blackplate selected from either path 8 or path 16, is then directed along path 18. Prior to surface preparation, blackplate from either path can be selectively treated with a stress-relief heat treatment at station 20; which means that the cold-reduced steel substrate can be selectively stress-relief heat-treated either before and/or after cold-rolling-gage reduction stage 14, or that such gage reduction or any heat treatment can be omitted. An important objective of the invention is to increase the surface area of flat rolled steel being manufactured economically by relying on cold-rolling gage reduction(s) while curtailing heat treatment. The result is to increase the number of consumer products, such as rigid sheet metal containers, which can be shaped from a coil of flat-rolled steel of given weight.

In the processing of FIG. 1, the selected blackplate product is then directed along path 21 for substrate surface preparation. Surface preparation stage 22 provides for selection from a plurality of surface cleansing techniques, including scrubbing, electrolytic cleaning and/or an acid pickling treatment. The strip is then fed, so as to avoid contact with an oxidizing atmosphere or with a particle contaminant, into corrosion-prevention coating stage 24. A sufficiently neutral or reducing atmosphere, and/or liquid submerged handling, or other means can be utilized to prevent contamination of planar substrate surfaces.

After surface cleansing in station 22, both planar blackplate surfaces are treated in corrosion-prevention station 24. The latter adjoins surface preparation stage 22 for purposes set forth in the previous paragraph. Corrosion-prevention plating is carried out, preferably using electrolytic action, by selecting from such coatings as tin, TFS, nickel, zinc or nickel zinc, chrome oxide (which can be carried out with or without electrolytic action in a sodium dichromate bath), or a primer coat of a polymeric material deposited electrolytically from suspension in an aqueous E-coat bath. In addition to corrosion-protection for the steel substrate, the plating at station 24 is selected to augment adhesion of the finish polymeric coating which will be part of the consumer items to be formed from new composite-coated tin mill product taught herein.

Electrolytic tin coatings in pounds per base box (31,360 sq inches) refer to the tinplating weight on the total area (both surfaces) of the substrate as described in *Making, Shaping and Treating of Steel,* supra, 8th Ed., p. 948. A flash coating (as used herein) of tinplate is about five to ten hundredths lb/bb total (both surfaces). Differential tin coating weights extend between a flash coating to about one-and-one-half lb/bb. After rinsing of tinplating electrolyte, the matte-finish tin as presented by such plating is preferred in further processing in place of flow-brightened surfaces. However, alloying a flash-coat of tin on one or both surfaces of the steel substrate has advantages for certain selections from the various types of products taught herein.

TFS and zinc coating weights are disclosed in the above-cited texts; and nickel or nickel-zinc coating weights are disclosed in U.S. Pat. No. 4,374,902 issued Feb. 22, 1983, and U.S. Pat. No. 4,416,737 issued Nov. 22, 1983. While vapor plating or cathode sputtering are adaptable to thin metal plating of flat rolled steel, the electrolytic plating and production capabilities of present tin mill practice are more competitive economically for most types of consumer products shaped from flat rolled steel.

An inorganic chemical passivating bath treatment, such as a sodium dichromate treatment, is preferred for the various forms of tin plated surfaces, and can enhance adhesion of finish organic coating by acting as a surfactant. An inorganic surface passivation treatment is available as part of the corrosion-prevention treatment at stage 24. Surface passivation augments surface protection when handling is required between production stages.

Immersion in a sodium dichromate bath, free of electrolytic action can deposit about one hundred fifty (150) micrograms of chrome oxide per square foot, plus or minus one hundred (100) micrograms/ft$^2$. Electrolytic action increases dichromate treatment coating weights in a range extending to about 650 (plus or minus 100) micrograms/ft$^2$ (such coating weights are measured on each surface).

A distinctive corrosion-prevention treatment can comprise an E-coat applied from aqueous suspension of a polymeric primer, such as an epoxy, which will enhance adhesion for subsequently-scheduled surface finish polymeric coating(s).

Such corrosion-prevention treatments diminish concern with metal substrate oxidation in production or in later use; and, enable the transfer of treated strip for those circumstances where the finish-surface coating cannot be applied in-line or at the corrosion-prevention plating site. Under circumstances requiring coil shipment before finish coating, an oil which is compatible with the subsequent coating, or is readily removable, can be applied to avoid surface abrasion during coiling. Preferably, however, the work product proceeds directly in-line, or at the location of the plating site for application of the finish coating at station 26.

To increase adaptability of in-line application of polymeric coatings as a finish surface in tin mill practice, such polymeric coating is preferably applied as a laminate which helps to avoid environmental concerns because polymerization (also referred to as "curing") can be completed prior to application in-line. Electrostatic particulate deposition of the polymer can have some of the same advantages.

Organic polymeric coating from a solvent solution can be applied in various ways —spray, roller or dip —by providing for solvent vapor recovery.

Molten polymeric materials can also be applied by means of thermal spray.

Adhesives can be "dried" or primer coats cured in facilities similar to those for recovery of a solvent carrier. Therefore, in the schematic representation, station 26 is followed by station 28 for carrying out either vapor recovery from drying adhesives or any of a combination of so-called "curing" steps or "setting" steps used for the finish coat. "Curing" for organic polymers can involve induction heating and/or use of infrared and/or differing types of electromagnetic radiation, such as ultraviolet, or combinations thereof.

While application of solid lamination film is preferred for environmental purposes, station 28 can be used in combination with laminate or other type of finish coat application. Details of solvent application of polymeric organic coatings for use in the canmaking industry are available from suppliers (Dexter Coating Co., Waukegan, Ill.; The Valspar Co. of Pittsburgh, Pa.; the BASF Corp. of Parsippany, N.J.). Regardless of the method of application, polymerization (whether referred to as curing or as setting) of the organic coating takes place before cold rolling of the composite-coated steel strip taught herein.

Also, the organic coating preferably embodies an organic lubricant, referred to as a "blooming compound," which is released under heat and/or rolling pressure. Similar lubricant (s) which are acceptable for ultimate consumer product uses can be surface-applied at lubrication augmenting station 30 or later, prior to product shaping. Solidification station 32 can be used to expedite lubricant application and solidification when surface-applied to augment the blooming compound. Organic lubricants can include petrolatum, lanolin and the like.

Organic polymeric coating with blooming compound, or augmented surface lubrication, facilitates the unique cold-rolling taught herein and helps eliminate any requirement for difficult-to-remove cold-rolling oils, such as those that have been utilized for cold-rolling gage reductions in the past.

Flat-rolled steel 34, composite-coated as described above, is cold rolled at a cold rolling mill that corresponds to cold-reduction stage 14; and, the same temper rolling mill can be used. However, a second cold-rolling mill is designated 36 in the general schematic arrangement of FIG. 1. That is, the same type of two-stage cold rolling mill (14) described initially, which is the type currently used in tin mill practice, can be used. That, along with use of present plating lines, makes significant economic contributions to the expansion of tin mill product made available herein.

Cold rolling of the composite-coated flat-rolled steel 34 can be used to reduce the substrate gage about twenty percent to about thirty-five percent; along with a corresponding cold reduction which takes place in the organic coating. It is significant that such cold rolling gage reduction of the composite-coated steel can be carried out without a significant departure from the nominal longitudinal yield strength of DR-9, as desired for subsequent consumer product processing. Notwithstanding gage reduction of composite-coated steel in the range of about twenty to thirty-five percent, yield strengths do not increase significantly above about 110 ksi.

The "grit finish" on the rolls of cold rolling station 36 is preferably selected to facilitate uniform distribution of the organic-type lubricant taught herein for can stock; such "grit finish" for cold rolling is also selected to avoid detrimental penetration of the finish polymeric coating during such cold reduction. Use of blooming compound in the organic coating facilitates the uniform distribution of lubricant, and also facilitates the increase in surface area of the organic coating.

Composite-coated flat-rolled steel product 38 is selectively controlled during processing to provide selective production of a variety of products ranging from (a) single cold-reduced (at station 36) composite-coated substrate of about fifty-five to about one hundred ten lb/bb (product 34), to (b) a triple cold-reduced, composite-coated substrate with a gage of about thirty-five to about fifty lb/bb; and, with a yield strength not significantly greater than that of the nominal range for DR9 which is preferable for most shaping.

Cold-rolled blackplate is free of anneal or stress relief heat treatment as introduced from coil 6. Such blackplate is initially cold-rolled at station 14 without intermediate or subsequent heat treatment. And the composite-coated substrate is subsequently cold-rolled at station 36 without intermediate or subsequent anneal to provide such triple-reduced product.

The composite-coated strip resulting from cold rolling in the tin mill before and after organic coating provides a low weight per unit surface area which improves the capability for steel to compete as rigid can stock with lower specific gravity metal and materials. However, the flat-rolled steel can be handled on current electroplating equipment at the desired heavier gage without special controls or features which would otherwise be required if one attempted to electroplate flat-rolled steel strip of about thirty-five to about fifty-five lb/bb. Thus, use of current electrolytic plating equipment lines under optimum conditions, is made practicable by the present invention.

Further, the processing selections make the new composite-coated flat-rolled steel available in a wide selection of substrate weights, a wide selection of coating weights for various and new consumer product uses, with enhanced finish properties because of the cold rolling of the composite-coated stock and with increased selections for subsurface corrosion protection.

The new tin mill production methods enable new and increased selection of tin mill product for fabricating consumer products from flat-rolled substrate starting with blackplate of about seventy-five lb/bb to about one hundred thirty-five lb/bb; the selections of base box weight are tabulated below:

| | Processing | Temper |
|---|---|---|
| 1. | Single cold-reduction at station 36 to about 45 to 110 lb/bb | |
| | (a) no stress-relief anneal | upper DR-9 to about 110 ksi |
| | (b) single stress-relief anneal at station 10 | DR-8 to DR-9 |
| | (c) dual stress-relief anneal at stations 10 & 20 | DR-8 |
| 2. | Dual cold-reduction at stations 14 and 36 to about 35 to 90 lb/bb | |
| | (a) no stress-relief anneal | Upper DR-9 to about 110 ksi |
| | (b) single stress-relief anneal at station 10 | DR-8 to DR-9 |
| | (c) dual stress-relief anneal at station 10 & 20 | DR-8 |

It should be noted that a cold reduction of about $33\frac{1}{3}\%$ increases the surface area of the product by about 50%. For example, a 10-ton coil of 60 lb/bb steel produces about 333 base boxes of can stock. Present teachings enable such coil to be reduced to 40 lb/bb, which produces about 500 base boxes of coated can stock; that is, an increase of about 50%.

Present composite coating and cold-rolling of the composite-coated stock teachings improve the range of flat-rolled steel with desired characteristics for subsequent part fabrication. By providing the draw lubricant entirely as blooming compound, the uniformity of the lubricant distribution achieved remains relatively uniform during the cold rolling of the composite coated stock. Smoother finish cold reduction rolls (referred to as 7C or 7K) are used in tin mill cold rolling stage 36; and, a smoother organic coat finish results. With surface-applied organic-type lubricant, selection of a grit surface for the rolls of stage 36 can be helpful in maintaining the uniformity of the draw lubricant for subsequent fabrication. On-line testing for desired lubricant level, as being further developed concurrently by assignee for application herewith, can be carried out at a stage prior to selectively providing desired supplemental lubrication for final cold-reduction.

Subsequent to cold-reduction at stage 36, lubrication of the strip also can be tested at station 40 and can be supplemented with surface-applied lubricant at stage 42. The latter can be dependent on expected handling and consumer product fabrication. Continuous strip 43 can be cut into blanks or sheets at station 44, prior to directing such cut material to press apparatus 46 to form one-piece drawn and ironed can bodies 48. Or, continuous strip 43 can be directed to continuous strip draw-forming station 50 for blanking, cupping and draw-forming into cups 52 or end closures (not shown).

As readily recognized by those skilled in the art, forming satisfactory one-piece can bodies presents difficult fabrication problems. The present composite-coated can stock decreases the weight of the material required per can body while producing a rigid sheet metal one-piece can body ready for direct use as fabricated in canning comestibles without requiring washing, a finish coating step and/or repair of finish coating.

In the expanded views of FIGS. 2, 3, 4 and 5 (in which like reference numbers are used for like parts), the flat-rolled steel substrate 60 has been cold-rolled from a starting gage, for the blackplate as delivered to the tin mill, in the range of about seventy-five lb/bb to about one hundred thirty-five lb/bb to a gage for the composite-coated product as cold rolled, in the range of about thirty-five lb/bb to about one hundred ten lb/bb.

Figure 2:
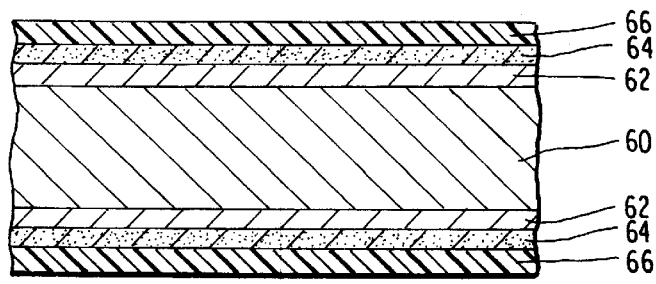
FIGS. 2, 3, 4 and 5 show enlarged cross-sectional views of composite-coated flat-rolled steel embodiments of the invention.

In FIG. 2, the electrolytically-applied corrosion-protection plating 62 comprises a metal, such as tin, nickel, zinc or nickel zinc; layer 64 comprises chrome oxide from a passivation treatment such as sodium dichromate; and layer 66 comprises the polymeric organic coat finish surface.

Figure 3:
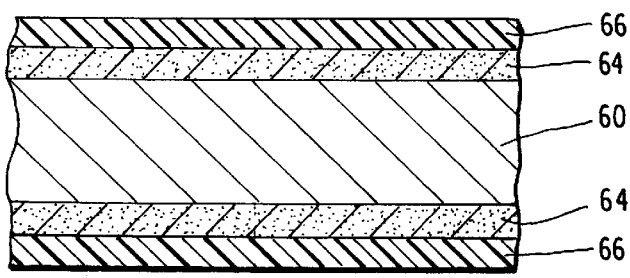

In FIG. 3, the corrosion-protection layer 64 comprises TFS; a combination of about 0.3 microinch of chrome metal and chrome oxide of about 0.3 to 2.0 milligrams/sq ft, as described in earlier patents and texts such as the above-referenced, *Making, Shaping and Treating of Steel.*

Figure 4:
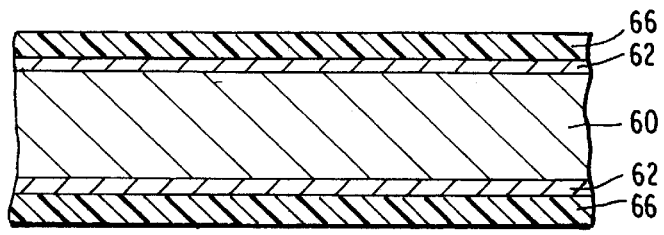

In FIG. 4, the corrosion-prevention plating 62 comprises a polymeric organic primer, such as an epoxy, deposited, for example, from solid suspension in an aqueous E-coat bath. The outer-finish coating 66 on both surfaces is a compatible polymeric coating.

Figure 5:
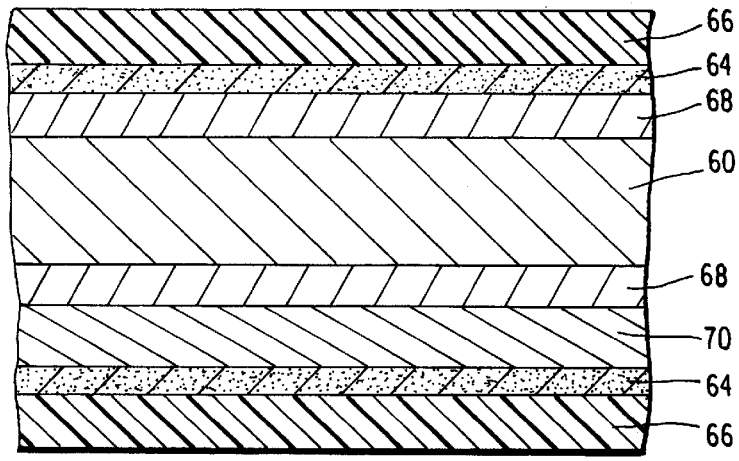

In the embodiment of FIG. 5, a flash coating 68 of free metal, e.g., tin of about 0.05 lb/bb to almost 0.10 lb/bb preferably matte-finished or alloyed, is provided on each surface of substrate 60. A differential-coat free metal layer 70, e.g., tinplate of about a quarter lb/bb to about one-and-one-half lb/bb is provided on one substrate surface. Preferably, matte-finish free-tin is used. Also, a passivation layer 64 is applied such as chrome oxide from a sodium dichromate treatment.

Such a dichromate (passivating) treatment is not utilized in the embodiments of FIG. 3 (TFS) or FIG. 4 (organic E-coat primer). However, it is preferred for protection and enhanced application of a polymeric organic finish coat 66 in the embodiment of FIG. 5. Other metallic platings, such as free NiZn, can be used in place of tin.

In FIGS. 2, 3, 4 and 5, finish surfaces 66 comprise a polymeric coating and a draw-type lubricant. The draw-type lubricant is preferably embodied in the organic coating as a blooming compound which is made available under the heat and pressure of cold rolling or cold fabrication; but, can be added to the surface of the organic coating. The polymeric organic coating for purposes of cold rolling or cold fabrication has been polymerized to have characteristics that are not subject to change under the temperatures encountered during cold rolling or cold fabrication coating weights for the polymeric organic coating are selected in the range of about three to about fifteen milligrams per square inc ($mg/in^2$) of surface.

Organic coatings and lubricants are selected from those approved by the U.S. F.D.A. for purposes of canning comestibles. Polymeric coatings for solvent and related types of applications can be selected from acrylics, vinyls, epoxies, polyesters and polyolefins; polypropylene, polyethylene terephthalates (PET) and polybutylente terephthalates (PBT) are customarily applied as solid laminating film.

Lubricants acceptable for canning comestibles comprise petrolatum, lanolin, and other acceptable source organic lubricants, namely, other fatty acid derivatives of animal or vegetable oils, as set forth at column 5, lines 64–65 in U.S. Pat. No. 5,296,127, which was granted on copending and co-owned application Ser. No. 07/926,055 identified above.

Referred to herein as "organic-type," such lubricants can be embodied in the organic coating and/or applied as a supplemental surface lubricant, total lubricant weight should be between about ten to about twenty milligrams per square foot of surface.

The inorganic oils such as DOS or ATBC, which have been relied on in the past, can be eliminated for the new cold rolling of composite-coated steel substrate for can stock as taught herein. Inorganic steel mill rolling oils can be difficult to remove.

Cold-rolling gage reduction of composite coated steel, using roll finishes as previously set forth, provides a smooth surface finish not previously available in tin mill practice and help to facilitate subsequent fabrication.

The above specific data, values and illustrations provide the bases for use of the subject matter by those skilled in the art as well as providing background for determining the scope of patentable subject matter by reference to appended claims.

What is claimed is:

1. Composite-coated flat-rolled steel can stock consisting essentially of flat-rolled low-carbon steel substrate having a weight in the range of about 35 to about 90 lb/bb which has been cold rolled with a corrosion-prevention subsurface plating applied, and a polymeric coating of about 2.5 to about 15 $mg/in^2$ with a lubricant acceptable for canning comestibles, such composite-coated flat-rolled steel being cold-rolled without subsequent stress relief heat treatment to provide can stock having longitudinal yield strength in the range above about 75 to about 110 ksi.

2. Composite-coated flat-rolled steel can stock, produced by

A. providing cold-reduced flat-rolled steel substrate in continuous-strip form, after stress-relief annealing heat treatment, having a substantially uniform thickness gage between planar surfaces of such substrate;

B. preparing both planar surfaces of such steel substrate for coating;

C. applying a passivating coating, selected from the group consisting of (i) an electrolytically-applied polymer and (ii) an inorganic chemical treatment coating consisting essentially of chrome oxide, to each such prepared planar surface of the steel substrate;

D. applying a finish-surface polymer coating to each of such passivated surfaces, followed by E. curing such finish-surface polymer so that such polymer coating is non-responsive to temperature resulting from a cold-rolling thickness gage-reduction of such composite-coated substrate, and F. cold-rolling such composite-coated flat-rolled steel, free of subsequent stress-relief heat treatment, to decrease steel substrate thickness in a range between about 20% and about 35% to a substantially uniform gage desired for fabricating product from such cold-reduced composite-coated flat-rolled steel substrate.

3. The product of claim 2, in which such cold-reduced flat-rolled steel substrate is cold-reduced in the range of about 20% to about 35% before preparing both surfaces for coating, and in which such cold-reduction of the finish-surface polymer coated strip produces a thickness gage in the range of about 0.0035" to about 0.0045".

4. The product of claim 2, in which applying such finish-surface polymer includes application of a lubricant.

5. The product of claim 4, in which such lubricant consists essentially of an organic draw-processing lubricant applied by selection from the group consisting of
   (a) embodied as a blooming compound in such finish-surface polymer,
   (b) applied to such finish-surface polymer, and
   (c) combinations thereof, and in which such cold-rolling gage-reduction is carried out by selecting grit-finished rolls for cold-rolling of such composite-coated substrate so as to maintain substantially uniform distribution of lubricant during such cold-rolling gage-reduction and to avoid significant irregular penetration of such finish-surface polymer during such cold-rolling.

6. Composite-coated flat-rolled steel can stock, produced by providing flat-rolled steel substrate, after stress-relief annealing heat treatment, as continuous-strip having a thickness gage in the range of about 75 to about 135 lbs/bb between planar surfaces;

cold-rolling thickness gage-reduction of such steel substrate, free of an intermediate stress-relief heat treatment, to produce a tensile strength of about 80 ksi, preparing both planar surfaces of such cold-reduced substrate for coating including surface cleansing selected from the group consisting of scrubbing and electrolytic cleaning, and further including removal of surface oxide; followed by passivating coating of both planar surfaces of such cold-reduced substrate by plating a polymer from an aqueous electrolytic plating bath; then producing a composite-coated steel substrate by applying a finish-surface polymer in conjunction with an organic lubricant to both such corrosion-prevention coated surfaces, with such finish-surface polymer being applied in the range of about three to about fifteen milligrams per square inch of surface, such organic lubricant being in the range of about ten to about twenty milligrams per square foot of surface, and carrying out preparation for cold-rolling of polymer applied to such substrate by selecting from the group consisting of (a) drying, (b) removing solvent, (c) setting, (d) curing, and (e) combinations thereof, such that any polymer on such substrate is non-responsive to a temperature rise resulting from a cold-rolling gage-reduction of such composite-coated steel substrate, and, then cold-rolling the composite-coated steel substrate to decrease substrate thickness gage to a thickness of about 0.0035" to about 0.005".

7. Composite-coated flat-rolled steel can stock, produced by providing flat-rolled single-reduced flat-rolled steel substrate of substantially uniform thickness gage between planar surfaces, subjecting such steel substrate to stress-relief annealing heat treatment;

preparing both planar surfaces of such single-reduced steel substrate for coating, including surface cleansing removal of surface scale and surface oxide; followed by passivating both such prepared planar surfaces by applying chrome oxide from a sodium-dichromate treatment bath in which such chrome oxide coating weight is selected in the range of about 50 to about 750 micrograms per square foot of surface; then producing a composite-coated substrate by applying a finish-surface polymer and an organic draw processing lubricant to both such passivated surfaces, with such finish-surface polymer being applied in the range of about three to about fifteen milligrams per square inch of surface, and such organic lubricant being applied in the range of about ten to about twenty milligrams per square foot of surface, and then preparing such finish-surface polymer for cold-rolling free of damage due to temperature rise during cold-rolling, and by selecting from the group consisting of (a) drying, (b) setting, (c) removing solvent, (d) curing, and (e) combinations thereof; and cold-rolling such composite-coated substrate to produce a tensile strength of about 80 ksi in such steel substrate.

8. Can stock product of claim 7, in which subsequent to such stress-relief annealing heat treatment, such single-reduced steel substrate is further subjected to a cold-rolling gage-reduction to produce double-reduced flat-rolled steel substrate before preparing such substrate for cooling, and such cold-rolling gage-reduction is carried out, free of intermediate or subsequent stress-relief heat treatment, to produce triple-cold-reduced composite-coated flat-rolled steel can stock having a thickness gage in the range of about 0.0035" to about 0.0045".

9. A one-piece can body fabricated from composite-coated flat-rolled steel substrate produced in accordance with the process as set forth in claim 7.

10. A one-piece can body fabricated from composite-coated flat-rolled steel substrate produced in accordance with the process as set forth in claim 8.

\* \* \* \* \*